United States Patent
Shervington et al.

(10) Patent No.: US 6,465,928 B1
(45) Date of Patent: Oct. 15, 2002

(54) MULTI-POLE GENERATOR ROTOR AND METHOD OF MAKING THE SAME

(75) Inventors: Roger Malcolm Shervington, Rockford, IL (US); Roger Carl Magnuson, Rockford, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 0 days.

(21) Appl. No.: 09/220,250

(22) Filed: Dec. 23, 1998

(51) Int. Cl.⁷ .............................. H02K 1/24; H02K 3/46
(52) U.S. Cl. ...................................... 310/270; 310/269
(58) Field of Search ............................... 310/214, 260, 310/270, 262, 170, 169, 168, 42, 179, 180, 184, 194, 195, 198, 208, 218, 261, 185, 129, 269

(56) References Cited

U.S. PATENT DOCUMENTS

| | | | | |
|---|---|---|---|---|
| 281,049 A | * | 7/1883 | Freeman | 310/195 |
| 831,740 A | | 9/1906 | Oswald | 242/433.2 |
| 1,503,254 A | | 7/1924 | Sippel et al. | 242/433.2 |
| 1,986,373 A | | 1/1935 | Shippy et al. | 242/433.2 |
| 2,610,804 A | | 9/1952 | Dreese | 242/433.2 |
| 3,305,741 A | | 2/1967 | Lindner | 310/261 |
| 3,898,491 A | * | 8/1975 | Long et al. | 310/183 |
| 4,063,123 A | | 12/1977 | Herr et al. | 310/270 |
| 4,075,522 A | * | 2/1978 | Hoffman | 310/214 |
| 4,562,641 A | * | 1/1986 | Mosher et al. | 29/598 |
| 4,658,170 A | * | 4/1987 | Ueda | 310/214 |
| 4,683,388 A | | 7/1987 | De Cesare | 310/46 |
| 4,876,469 A | * | 10/1989 | Khutoretsky et al. | 310/52 |
| 5,325,009 A | * | 6/1994 | Capion et al. | 310/261 |
| 5,449,963 A | | 9/1995 | Mok | 310/270 |

* cited by examiner

Primary Examiner—Nestor Ramirez
Assistant Examiner—Guillermo Perez
(74) Attorney, Agent, or Firm—Marshall O'Toole Gerstein; Murray & Borun

(57) ABSTRACT

A multi-pole generator rotor and a method of making the same are disclosed. A multi-pole generator rotor includes a rotor body having a central portion with a generally cylindrical outer surface. The outer surface includes three pairs of diametrically opposed slots extending along a length of the central portion, with each of the slots being sized to receive therein a plurality of wires. Each of the slots further includes a pair of opposed retaining flanges. A plurality of retaining members are sized for insertion into a corresponding one of the slots. Each retaining member engages a pair of the retaining flanges from its corresponding slot. The retaining members thereby retaining the wires disposed in each slot against radially outward displacement. A method of forming a multi-pole generator rotor includes the steps of providing the above rotor body, winding first, second and third wire coils by repeatedly winding a wire through a first, second, and third set of opposing slot pairs, and inserting a retaining member longitudinally into each of the slots.

5 Claims, 5 Drawing Sheets

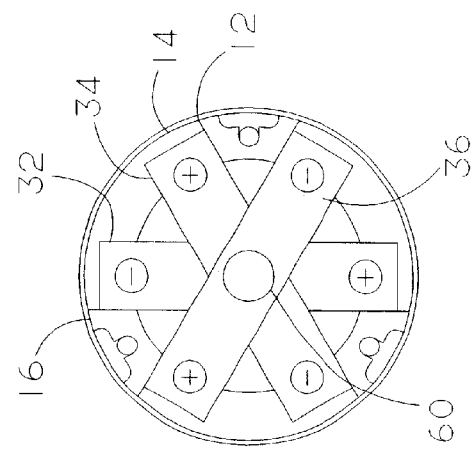
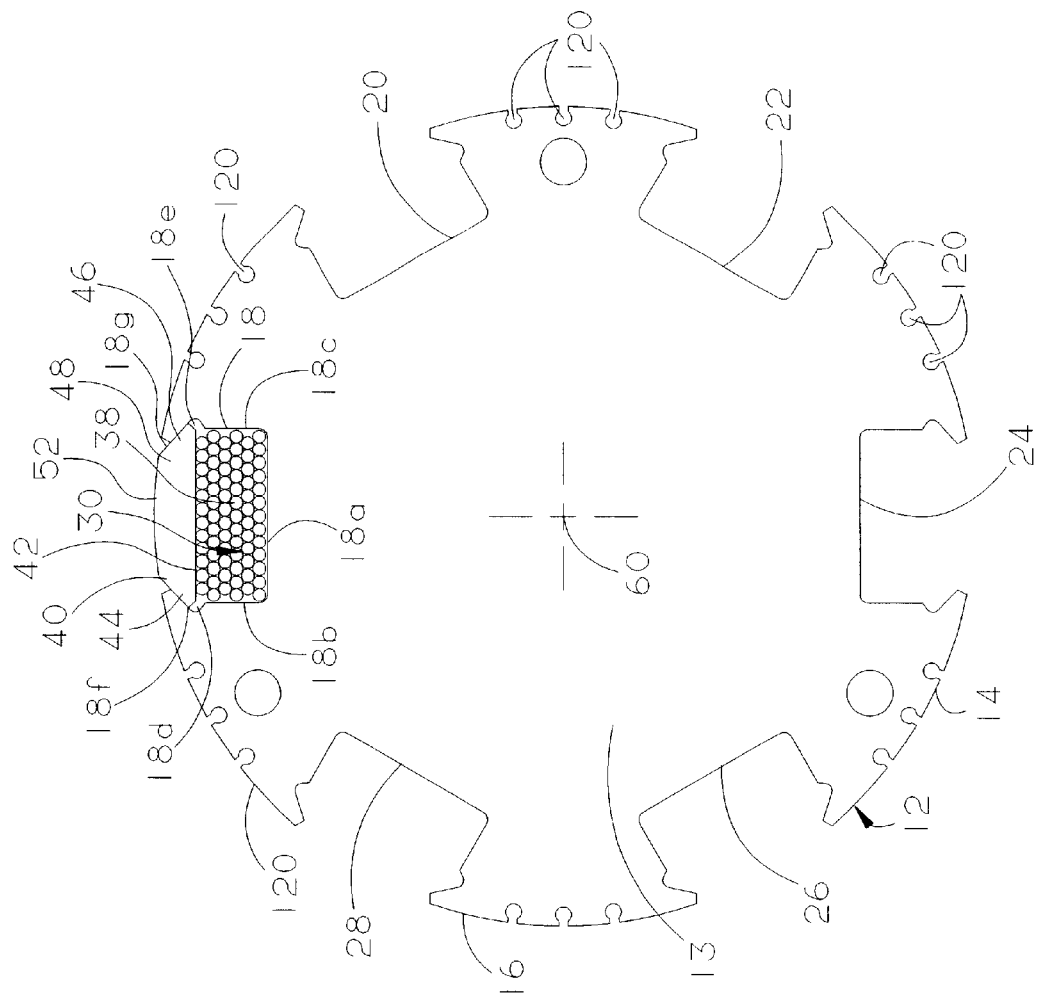

MULTI-POLE GENERATOR ROTOR AND METHOD OF MAKING THE SAME

FIELD OF THE INVENTION

The present invention relates to generator rotors, such as multi-pole generator rotors suitable for high speed applications.

BACKGROUND OF THE INVENTION

Feasibility investigations suggest that power generators for aircraft and spacecraft may be constructed using highly efficient magnetic bearings. However, these same investigations suggest that weight effective designs can be achieved only with very high speed applications. Typical power generators, such as power generators found in aircraft, operate in the range of 24,000 rpm, and typically employ the pole configuration illustrated in FIG. 8 of the drawings. One problem encountered by the typical configuration shown is that at high rpm's the resulting high centrifugal forces causes a radially outward displacement of the end-turns of the winding. This outward displacement causes the rotor to go out of balance and also creates the potential for field failure. Moreover, the sharp turns encountered by the wire on the region of the pole tip limits the gauge of wire that may be employed. Thus, it would be desirable to develop an improved winding system and an improved rotor design which would be operable at high speeds.

SUMMARY OF THE INVENTION

A six pole generator construction having an odd number of pole pairs constructed according to the teachings of the present invention will have a design speed of 50,000 rpm with an overspeed in the range of 55,000 rpm.

According to a first aspect of the invention, a multi-pole generator rotor comprises a rotor body including a central portion having a generally cylindrical outer surface. The outer surface includes three pairs of diametrically opposed slots extending along a length of the central portion, with each of the slots being sized to receive therein a plurality of wires. Each of the slots further includes a pair of opposed retaining flanges. A plurality of retaining members are sized for insertion into a corresponding one of the slots, with each retaining member engaging the opposed retaining flanges of its corresponding slot. The retaining members thereby retain the wires disposed in each slot against radially outward displacement.

In further accordance with a first aspect of the invention, the rotor body is rotatably mounted to a generator housing, and a continuous wire winding is wound upon the rotor body such that a plurality of wire sections is disposed in each of the slots. The rotor body includes a pair of ends connected by a central axis, and the wire winding includes a plurality of end portions adjacent each of the rotor body ends. Each of the wire winding end portions crosses the rotor body central axis, and an end support mounted to each of the rotor body ends supports the adjacent wire end portions. Preferably, the end supports include a plurality of aligning prongs, such as six aligning prongs. Still preferably, a cap member is mounted to each of the rotor body ends, with each of the cap members engaging an adjacent end support.

Preferably, each cap member also engages the end portions of the adjacent retaining members, thereby preventing longitudinal movement or displacement of the retaining members.

Preferably, the rotor body is mounted to a shaft, which shaft is rotatably mounted within a generator housing. Each of the cap members may include three intersecting grooves, with each of the grooves being sized to overlie an adjacent wire end portion. Each of the slot retaining flanges may include an angled surface, and each of the retaining members includes a wedge shaped edge. Each wedge shaped edge is sized to engage an adjacent angled surface, thereby securing each retaining member against radially outward displacement.

In accordance with a second aspect of the invention, a multi-pole generator rotor for receiving a continuous wire winding comprises a rotor body having a generally cylindrical central portion, with the central portion including a plurality of slots extending along the length thereof. Each of the slots is sized to receive a portion of the wire winding. Each of the slots further includes a pair of longitudinally extending edge portions, with each of the edge portions defining a retaining flange. A plurality of retaining members are provided, with each retaining member being sized for insertion in a corresponding one of the slots. Each of the retaining members includes a pair of edges sized to engage the edge portions of its corresponding slot. Thus, the wire winding portion disposed in each slot is held in a fixed position by the corresponding retaining member.

In accordance with another aspect of the invention, a multi-pole generator rotor comprises a rotor body having a generally cylindrical central portion, with the central portion including six slots extending along the length thereof. Each of the slots includes a pair of longitudinally extending edge portions, with each of the edge portions defining a retaining flange. A continuous wire winding is wound about the rotor body and defines three pole pairs, with each of the pole pairs engaging diametrically opposite slots. Six retaining members are provided, with each of the retaining members being sized for insertion in a corresponding one of the slots. Each of the retaining members includes a pair of edges sized to engage the adjacent retaining flanges. Accordingly, a portion of each coil disposed in each of the slots is held in a fixed position by the corresponding retaining member.

In accordance with a still further aspect of the invention, a multi-pole generator rotor comprises a rotor body including a central portion having a generally cylindrical outer surface. The outer surface includes at least one pair of diametrically opposed slots extending along a length of the central portion, with each of the slots being sized to receive therein a plurality of wires. Each of the slots further includes a pair of opposed retaining flanges. A plurality of retaining members are sized for insertion into a corresponding one of the slots, with each retaining member engaging the opposed retaining flanges of its corresponding slot. The retaining members thereby retain the wires disposed in each slot against radially outward displacement. Preferably, the rotor body outer surface may have an odd number of slot pairs.

In accordance with yet another aspect of the invention, a method of forming a multi-pole generator rotor comprises the steps of providing a rotor body having a cylindrical central portion and a plurality of diametrically opposed slot pairs defined in the central portion, with each of the slots in each slot pair extending along the length of the central portion. A first coil is formed by repeatedly winding a wire through a first of the plurality of slot pairs, a second coil is formed by repeatedly winding a wire through a second of the plurality of slot pairs, and a third coil is formed by repeatedly winding a wire through a third slot pair. A retaining member is inserted longitudinally into each of the slots.

Preferably, an end cap is secured to opposite ends of the rotor body. Further, each of the coils includes opposing end portions, and a coil support is inserted between each of the end caps and the adjacent coil end portions. Still preferably, opposing end portions of each of the coils are supported during winding. Each of the retaining members may be secured against longitudinal movement, such as by the end cap. The end cap is preferably sized to receive the adjacent coil end portions. Support for the rotor body and the end caps may be provided by shrink forming a retaining sleeve about the rotor body.

Additional features and advantages of the present invention will become readily apparent to those skilled in the art upon reading the following detailed description.

BRIEF DESCRIPTION OF THE DRAWINGS

FIG. 2 is an enlarged cross-sectional view of the rotor body having a plurality of wire sections disposed in one of the slots;

FIG. 3 is an end view of the rotor body having the end support attached and having three wire coils formed thereon;

DETAILED DESCRIPTION OF THE INVENTION

The embodiments described herein are illustrative and are not intended to limit the invention to precise forms disclosed. Rather, the embodiments have been chosen and described in order to best enable those skilled in the art to follow the teachings of the present invention.

Figure 1:
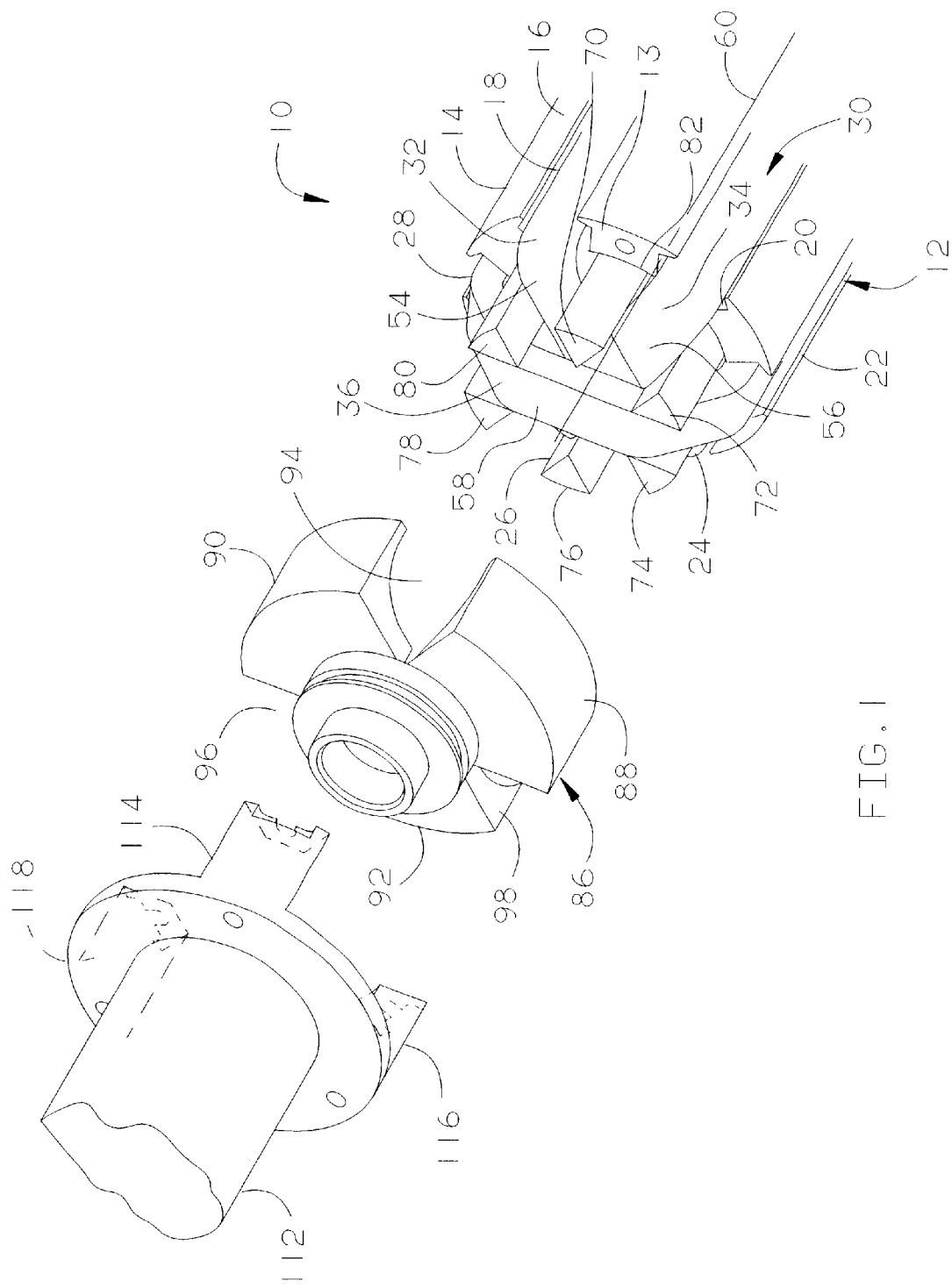
FIG. 1 is an exploded fragmentary view in perspective of a multi-pole generator rotor and associated components all constructed in accordance with the teachings of the present invention.

Referring now to the drawings, a multi-pole generator rotor assembled in accordance with the teachings of the present invention is generally referred to by the reference numeral 10. As shown in FIGS. 1 and 2, the generator rotor 10 includes a rotor body 12 having a central portion 14 having a generally cylindrical outer surface 16. The rotor body 12 includes a pair of ends 13, 15 (the end 15 of the rotor body 12 is viewable only in FIG. 6, but as is explained below, the end 15 is substantially similar to the end 13). The outer surface 16 includes a plurality of longitudinally extending slots 18, 20, 22, 24, 26 and 28, which are arranged circumferentially about the outer surface 16 of the rotor body 12. For purposes which will be explained below, each of the slots is paired with a diametrically opposite slot, i.e., the slot 18 is paired with the slot 24, the slot 20 is paired with the slot 26, and the slot 22 is paired with the slot 28.

The slots 18, 20, 22, 24, 26 and 28 are adapted to receive therein a continuous wire winding 30 which is wound about the rotor body 12 to form three wire coils 32, 34 and 36 as shown in FIG. 3. The first coil 32 is disposed in the slot pair 18 and 24, the second wire coil is disposed in the slot pair 20 and 26, while the third wire coil is disposed in the slot pair 22 and 28. It will be appreciated that the coil 32 has a negative pole disposed in the slot 18 and a positive pole disposed in the slot 24, the coil 34 has a negative pole disposed in the slot 26 and a positive pole disposed in the slot 20, and the coil 36 has a negative pole disposed in the slot 22 and a positive pole disposed in the slot 28. Each of the coils 32, 34 and 36 is disposed parallel to and lying along a central axis 60 of the rotor body 12.

It will be understood that the structure of each of the slots 18, 20, 22, 24, 26 and 28 is identical. However, only the structure of the slot 18 will be described herein in detail. The slot 18 includes a bottom wall 18a, and a pair of opposing sidewalls 18b and 18c. A portion of the sidewalls 18b and 18c include a lip or flange 18d, 18e, respectively. The flanges 18d and 18e each include an angled surface 18f, 18g, respectively. The slot is sized to receive therein a plurality of wire sections 38 from the positive pole of the first wire coil 32. It will be understood that a similar wire section from the negative pole of the first coil 32 is disposed in the slot 24. Further, wire sections from each of the second and third coils 34, 36, reside in the slot pair 20 and 26 and in the slot pair 22 and 28, respectively.

Figure 7:
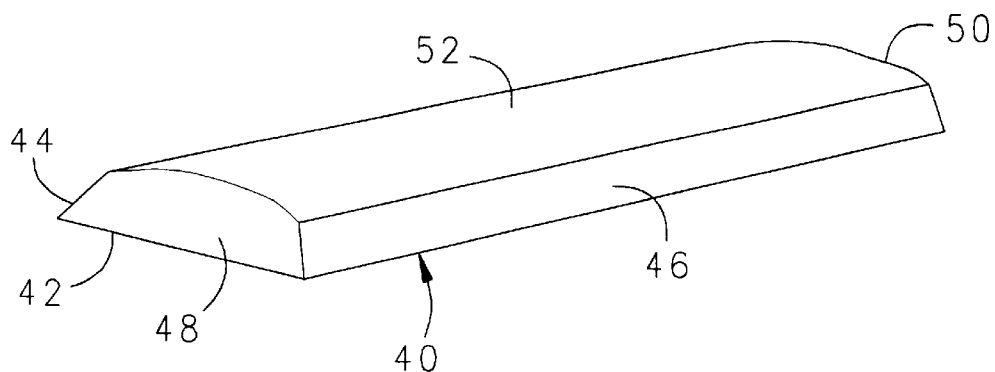
FIG. 7 is an enlarged view in perspective of one of the retaining members.

A plurality of retaining members 40 are provided, one of which is viewable in FIG. 2 and which is also shown in FIG. 7. Although only a single retaining member 40 is shown or described in detail, it will be understood that a retaining member 40 will be provided for each of the slots 18, 20, 22, 24, 26 and 28. Each retaining member 40 includes a radially inward or bottom surface 42 and a pair of angled or wedge shaped edges 44, 46 extending between a pair of ends 48, 50. Each retaining member 40 also includes a radially outward surface 52, which is preferably curved to match the outer surface 16 of the central portion 14 of the rotor body 12.

Referring now to FIG. 1, each of the coils 32, 34 and 36 includes a pair of end portion 54, 56 and 58, respectively, disposed adjacent each of the ends 13, 15 of the rotor body 12. Although only the end portions 54, 56 and 58 adjacent to the end 13 of the rotor body 12 is shown, it will be understood that the end portions disposed adjacent the end 15 of the rotor body 12 are identical. As shown in FIG. 1, the end portion 56 of the coil 34 overlies the end portion 54 of the coil 32, and the end portion 58 of the coil 36 overlies the end portion 56 of the coil 34. Each of the end portions 54, 56 and 58 crosses the central axis 60 of the rotor body 12.

Figure 4:
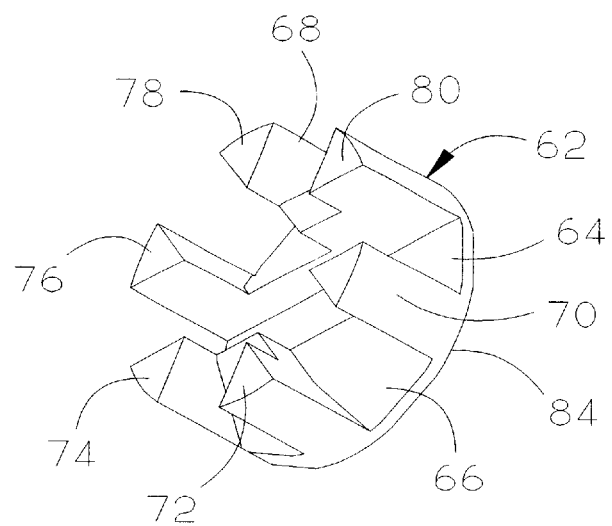
FIG. 4 is a perspective view of a wire winding end support.

Referring now to FIGS. 1 and 4, an end support 62 includes three diametric slots 64, 66 and 68, which are separated by six aligning prongs 70, 72, 74, 76, 78 and 80. The end support 62 is preferably constructed of plastic and is generally round. Each of the aligning prongs 70, 72, 74, 76, 78 and 80 includes a generally triangularly shaped cross section. An end support 62 is mounted to each of the ends 13, 15 of the rotor body 12, such that the end portion 54 of the coil 32 is disposed in the slot 64, the end portion 56 of the coil 34 is disposed in the slot 66, and the end portion 58 of the coil 36 is disposed in the slot 68. Further, the aligning prongs 70, 74, 76 and 80 align the end portion 54 of the coil 32, the prongs 70, 72, 76 and 78 align the end portion 56 of the coil 34, and the prongs 72, 74, 78 and 80 align the end portion 58 of the coil 56. Each end 13, 15 of the rotor body 12 may include a circular depression or seat 82, which is sized to receive the circular base 84 of the end support 62.

Figure 5:
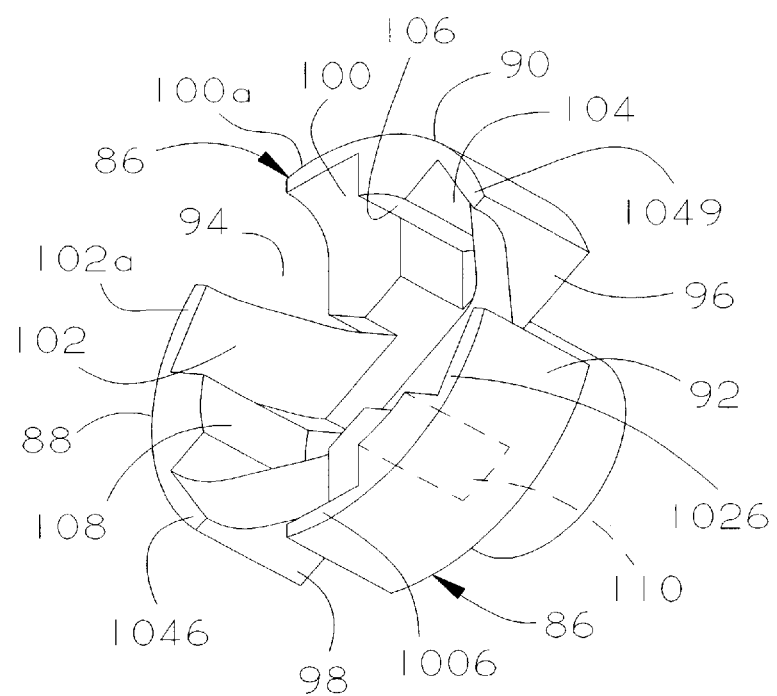
FIG. 5 is a perspective view of an end cap for placement over the end support.

Referring now to FIGS. 1 and 5, an end cap 86 includes three radially extending flange portions 88, 90 and 92, separated by three cutouts 94, 96 and 98. The end cap is preferably plastic. An end cap 86 is preferably mounted to each of the ends 13, 15 of the rotor body 12 in a position to generally overlie the adjacent end support 62 as will be explained below. Accordingly, two such ends caps 86 will be provided, although only a single end cap 86 will be described in detail. Terminals (not shown) are provided in one of the caps 86 in order to provide electrical connection to the winding as would be known to those of skill in the art.

The end cap 86 includes three grooves 100, 102 and 104. The groove 100 is sized to abut or overlie the end portion 54 of the coil 32, the groove 102 is sized to abut or overlie the end portion 56 of the coil 34, and the groove 104 is sized to abut or overlie the end portion 58 of the coil 36. As can be seen in FIG. 5, each of the grooves 100, 102, 104 is shaped to match the shape or curvature of their corresponding coil end portions 54, 56 and 58, respectively. The groove 100 terminates near two diametrically opposed edge portions 100*a* and 100*b*, the groove 102 terminates near a pair of diametrically opposed edge portions 102*a* and 102*b*, and the groove 104 terminates near a pair of diametrically opposed edge portions 104*a* and 104*b*.

When a cap 86 is secured to the end 13 of the rotor body 12, the edge portions 100*a*, 100*b* will abut and thus secure the adjacent ends 48 of the retaining member 40 disposed in each of the slots 18 and 24. Similarly, the edge portions 102*a*, 102*b* will abut a retaining member 40 disposed in each of the slots 20, 26, while the edge portions 104*a*, 104*b* will abut a retaining member 104*a*, 104*b* disposed in each of the slots 22, 28. A cap 86 secured to the end 15 of the rotor body 12 will abut the adjacent ends 50 of the corresponding retaining members 40 in the same manner.

Each of the caps 86 further includes three recesses 106, 108, 110 which are sized to receive one of the aligning prongs, such as the aligning prongs 80, 72, and 76, respectively. It will be appreciated that the remaining aligning prongs 70, 74, 78 will be disposed in a corresponding one of the cutouts 94, 98 and 96, respectively.

As shown in FIG. 1, a rotatable shaft 112 having three prongs 114, 116 and 118 is mountable to the rotor body 12 so as to secure the cap 86 in pace. The prongs 114, 116 and 118 fit through the recesses 94, 98 and 96, respectively. The prong 114 is mountable to the rotor body 12 between the slots 18 and 20, the prong 116 is mountable to the rotor body 12 between the slots 22 and 24, and the prong 118 is mountable to the rotor body between the slots 26 and 28. The shaft 112 is connected to other components of the generator, such as an exciter and other required components as would be known to one of skill in the art. A support shaft (not shown) is mounted to the other end 15 of the rotor body 12 in a similar manner.

In operation, an end support 62 is positioned adjacent each of the ends 13, 15 of the rotor body 12 with the base 84 of each support 62 disposed in the seat 82 adjacent each end 13, 15. The coils 32, 34 36 are then wound upon the rotor body using a conventional armature winding machine. Slots or grooves may be provided in the end supports 62 to facilitate crossover between coils to ensure proper current direction.

Figure 8:
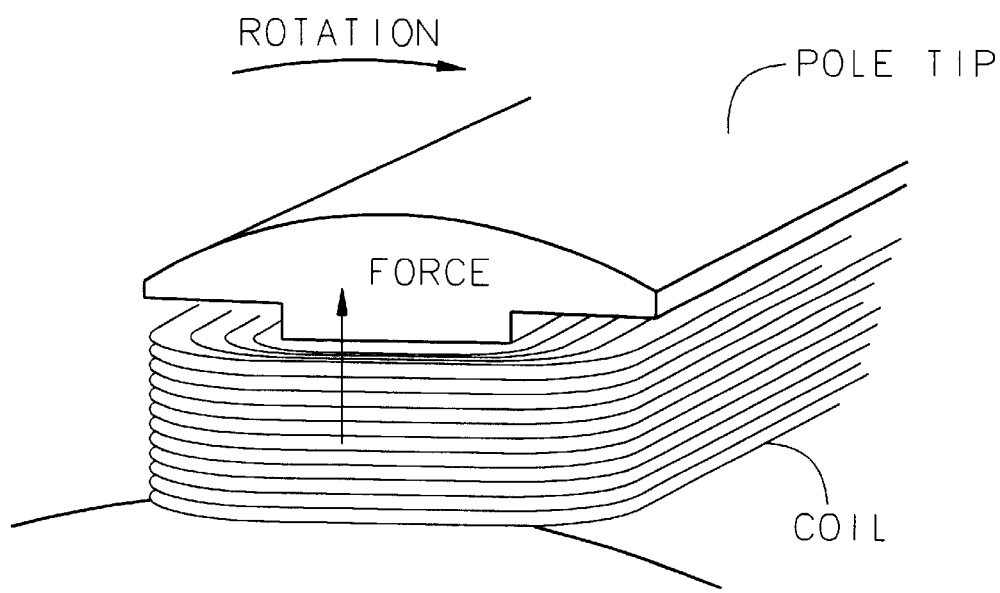
FIG. 8 is an enlarged fragmentary view in perspective of a conventional wire wound generator pole constructed in accordance with the teachings of the prior art.

It will be appreciated that a heavier/stiffer gauge of wire may be employed due to the more gradual curvature required when winding the wire longitudinally about the rotor body 12 as compared to the sharp turns required by the prior art approach shown in FIG. 8. The coils 32, 34 and 36 are wound in succession using a continuous wire, and the end portions 54, 56, and 58 are disposed in the slots 64, 66, 68, respectively, and are supported by their adjacent aligning prongs 70, 72, 74, 76, 78 and 80.

Upon the completion of the coil winding, a retaining member 40 is inserted longitudinally into the slot 18. The bottom surface 42 overlies and secures the wire sections disposed in each of the slots, such as is shown in FIG. 2. The wedge shaped edges 44, 46 extending between the ends 48, 50 engages the adjacent angled surfaces 18*f*, 18*g* of the flange 18*d* and 18*e*, respectively. The wire section 38 is thus confined on two sides by the slot sidewalls 18*b* and 18*c*, and is held to the slot bottom wall 18*a*. Additional retaining members 40 are inserted into each of the remaining slots 20, 22, 24, 26 and 28 in a similar manner.

Upon insertion of the retaining members 40, an end cap 86 is placed over each end 13, 15 of the rotor body 12, such that each end cap 86 interlocks with and engages the adjacent end support 62 and the three coils 32, 34, 36 in the manner described above. The end supports 62 ensure proper layering of the wire sections in the region of the end turns. Each tier of wire is wound over the previous tier. The retaining members 40 are secured against longitudinal movement by the edge portions 100*a*, 100*b*, 102*a*, 102*b*, 104*a*, and 104*b* of the caps 86. The retaining members 40, the end supports 62 and the end caps 86 ensure precise support of the winding during high speed operation, i.e., the retaining members 40 prevent radially outward displacement of the wire sections 38 disposed in each of the slots, while the end supports 62 and the end caps 86 prevent lateral or radially outward movement or displacement of each of the wire end portions 54, 56 and 58.

Figure 6:
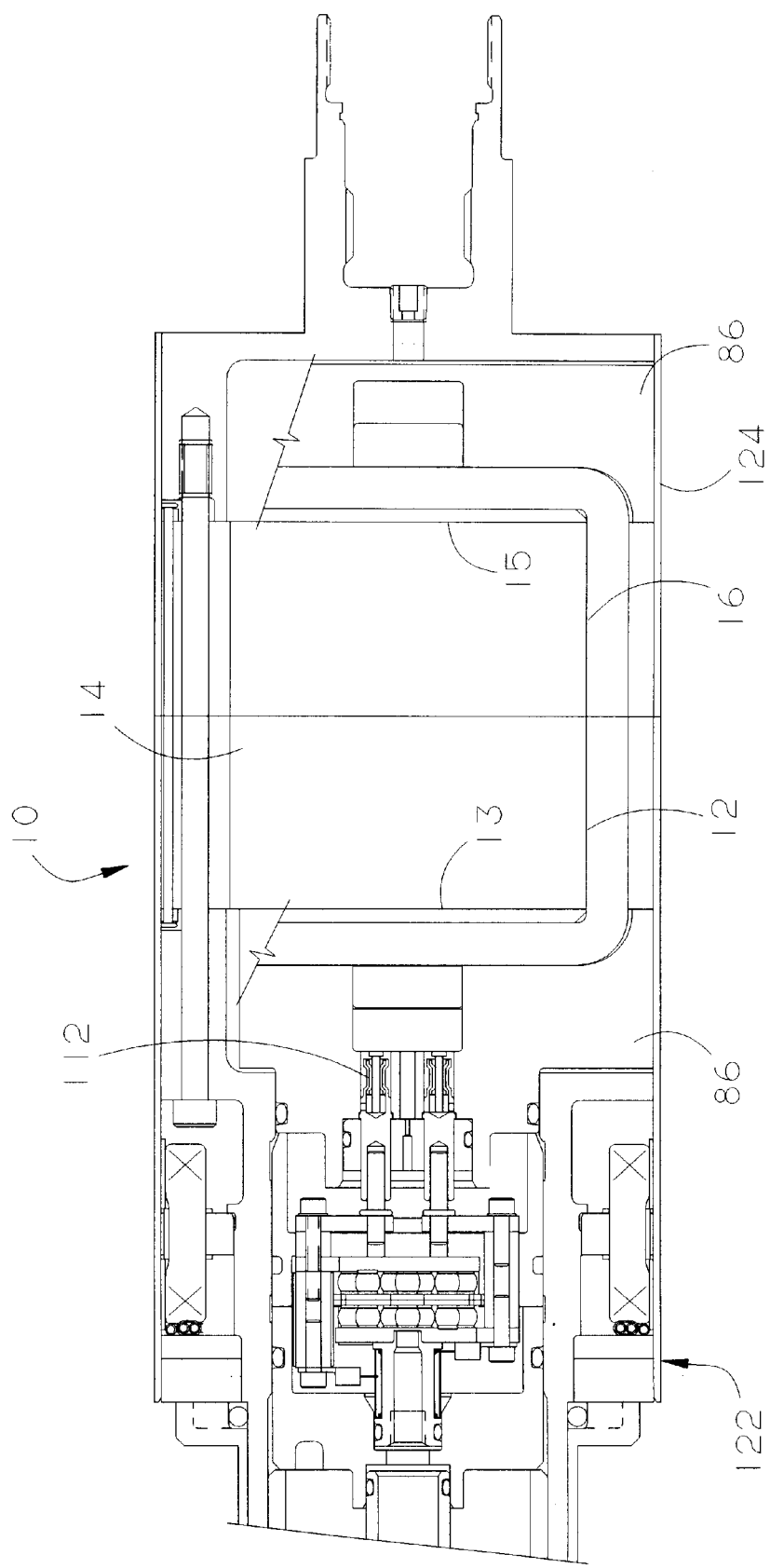
FIG. 6. is a fragmentary cross-sectional view of a power generator having a rotatable rotor body assembled in accordance with the teachings of the present invention and shown mounted for rotatable movement inside a generator housing.

The rotatable shaft 112 and the support shaft (not shown) are then connected, and the rotor 10 is ready for insertion into the generator 122 shown in FIG. 6. The rotor 10 is preferably housed in a stainless steel or composite cylinder 124 into which cooling oil is injected under pressure in order to cool the winding of the coils 32, 34 and 36. The cylinder 124 is preferably sized to fit very tightly around the outer circumference of the rotor body 12 in order to provide mechanical support for the rotating components. This may be accomplished by shrink fitting the outer cylinder 124 around the rotor 10 as a last step after the assembly of the coils 32, 34 and 36, the attachment of the end supports 62 and the caps 86 and the attachment of the shaft 112. The cylinder 124 also serves to longitudinally confine the shaft 112 as well as the caps 86. A plurality of grooves or slots 120 are provided about the periphery of the outer surface 16 of the rotor body 12 as shown in FIG. 2 to facilitate oil circulation.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A multi-pole generator rotor, comprising:
    a rotor body, the rotor body having a pair of ends, the rotor body including a central portion having a generally cylindrical outer surface, the outer surface having at least one pair of diametrically opposed slots extending along a length of the central portion, each of the slots being sized to receive therein a plurality of wires, each of the slots further including a pair of opposed retaining flanges;
    a plurality of retaining members, each of the retaining members being sized for insertion into a corresponding one of the slots and to engage the retaining flanges of its corresponding slot, the retaining members thereby retaining the wires disposed in each slot against radially outward displacement;

an end support mounted to each of the ends, each end support having a plurality of prongs, each of the prongs being spaced to receive therebetween a portion of the wire winding; and an end cap mounted to each of the ends of the rotor body over an adjacent one of the end supports, each of the end caps including a plurality of diametrically oriented slots sized to receive therein another portion of the wire winding.

2. The generator rotor of claim 1, wherein the outer surface includes an odd number of pairs of diametrically opposed slots.

3. A multi-pole generator rotor, comprising:

a rotor body, the rotor body having a pair of ends connected by a central axis, the rotor body further including a central portion having a generally cylindrical outer surface, the outer surface having three pairs of diametrically opposed slots extending along a length of the central portion, each of the slots including a pair of opposed retaining flanges;

a plurality of retaining members, each of the retaining members being sized for insertion into a corresponding one of the slots and to engage the retaining flanges of its corresponding slot, the retaining members thereby retaining the wires disposed in each slot against radially outward displacement;

a continuous wire winding, the wire winding including a plurality of wire sections disposed in each of the slots, the wire winding further including a plurality of end portions adjacent each of the rotor body ends, each of the wire winding end portions crossing the central axis;

an end support mounted to each of the rotor body ends, each end support supporting the adjacent wire end portions; and a cap member mounted to each of the rotor body ends, each of the cap members engaging an adjacent end support, each of the cap members further including three intersecting grooves, each of the grooves being sized to overlie an adjacent wire end portion.

4. A multi-pole generator rotor comprising:

a rotor body, the rotor body including a pair of ends connected by a central axis, the rotor body further including a generally cylindrical central portion, the central portion including a plurality of slots extending along the length thereof, each of the slots further having a pair of longitudinally extending edge portions, each of the edge portions defining a retaining flange; and a plurality of retaining members, each of the retaining members having a pair of ends and being sized for insertion in a corresponding one of the slots, each of the retaining members including a pair of edges sized to engage its corresponding slot edge portions;

a continuous wire winding, the wire winding having a plurality of wire sections disposed in each of the slots, the wire winding including three coils, each of the coils engaging a pair of diametrically opposed slots, each of the coils further including a pair of end portions adjacent each of the rotor body ends, each of the coil end portions crossing the central axis;

a coil support mounted to each of the rotor body ends, each coil support supporting the adjacent coil ends; and a cap mounted to each of the rotor body ends, each cap engaging the adjacent retaining member ends, each cap further including a plurality of grooves sized to receive the adjacent coil ends;

whereby the wire winding portion disposed in each slot is held in a fixed position by the corresponding retaining member.

5. A multi-pole generator rotor comprising:

a rotor body including a pair of ends and an interconnecting central axis, the rotor body having a generally cylindrical central portion, the central portion including a plurality of slots extending along the length thereof, each of the slots being sized to receive a portion of the wire winding, each of the slots further having a pair of longitudinally extending edge portions, each of the edge portions defining a retaining flange; and a plurality of retaining members, each of the retaining members being sized for insertion in a corresponding one of the slots, each of the retaining members including a pair of edges sized to engage its corresponding slot edge portions;

a wire winding forming three coils, each of the coils being disposed in a pair of diametrically opposed slots, each of the coils including a pair of end portions, a first one of the end portions of each coil being disposed adjacent a first one of the ends of the rotor body, a second one of the end portions of each coil being disposed adjacent a second one of the ends of the rotor body;

a cap mounted to each of the ends of the rotor body, each cap having three intersecting grooves, each of the grooves being sized to overlie one of the end portions of the coil;

an end support mounted to each rotor body end, the end support at each rotor body end being mounted between the adjacent rotor body end and the adjacent cap, each end support including six aligning prongs;

whereby the wire winding portion disposed in each slot is held in a fixed position by the corresponding retaining member.

* * * * *